March 4, 1924.
W. S. FERDON
1,485,781
AERODYNAMIC STABILIZER FOR AIRCRAFT
Filed Oct. 22, 1921          7 Sheets-Sheet 1
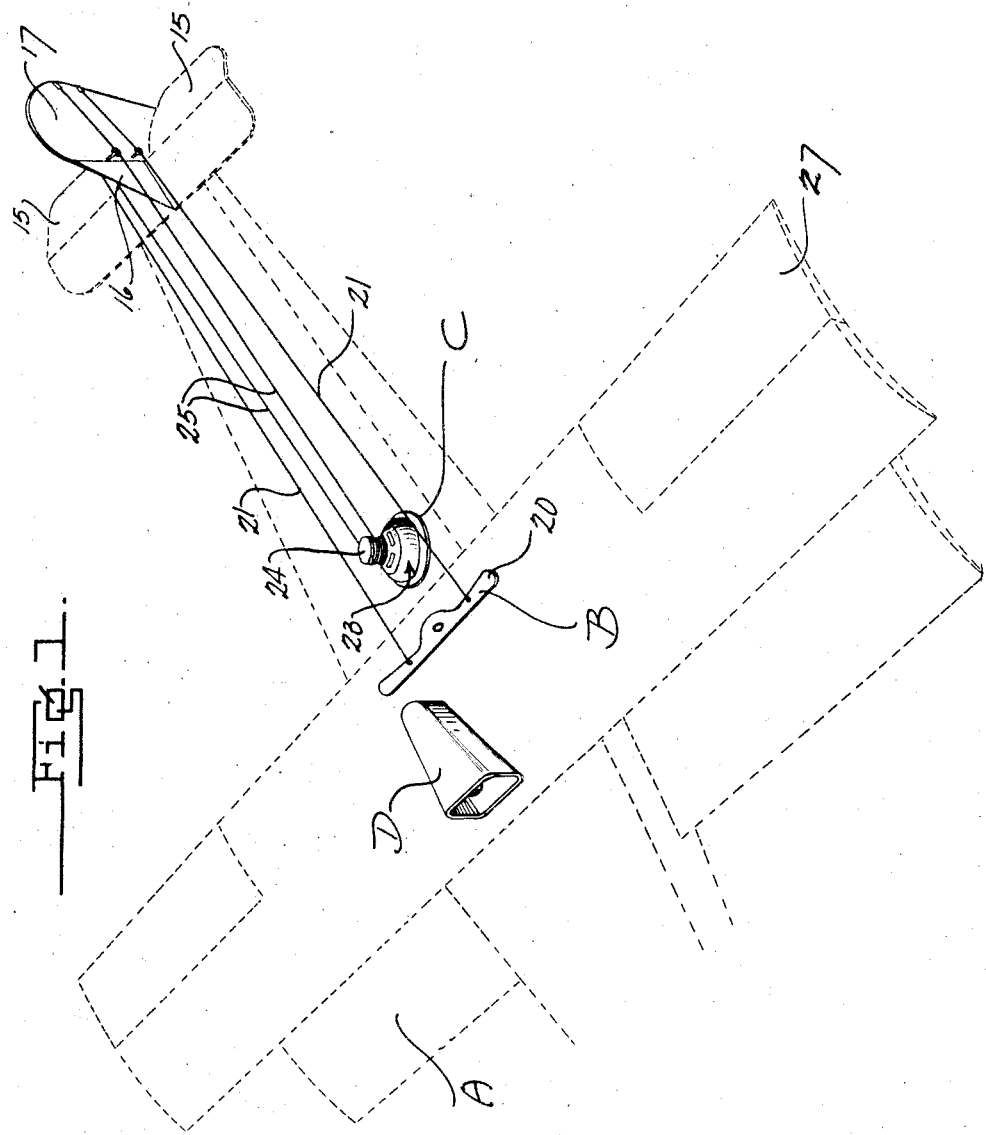
William S. Ferdon.
Inventor
By Lancaster and Allwine
Attorneys

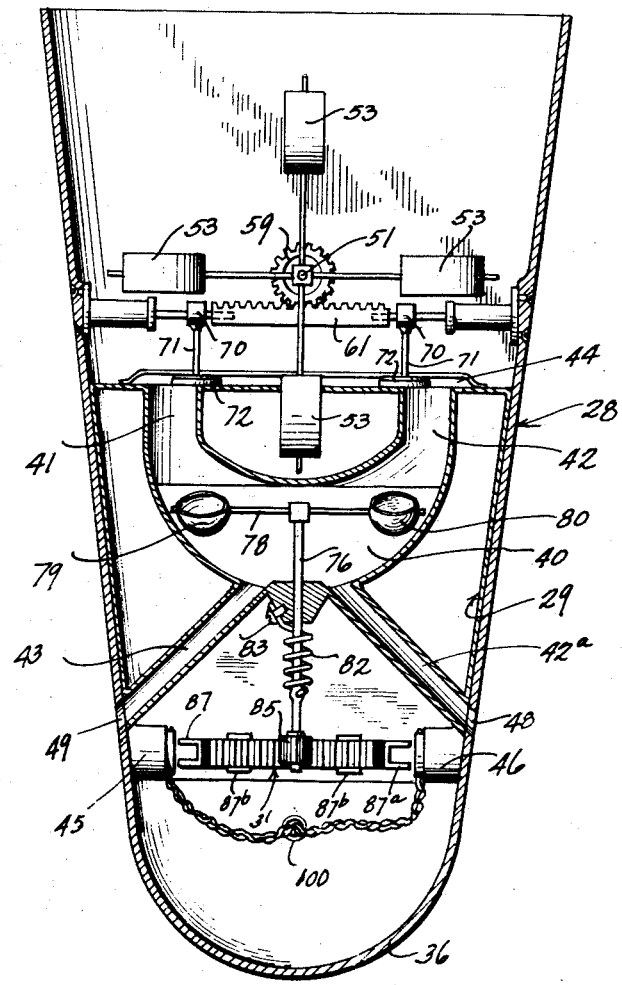

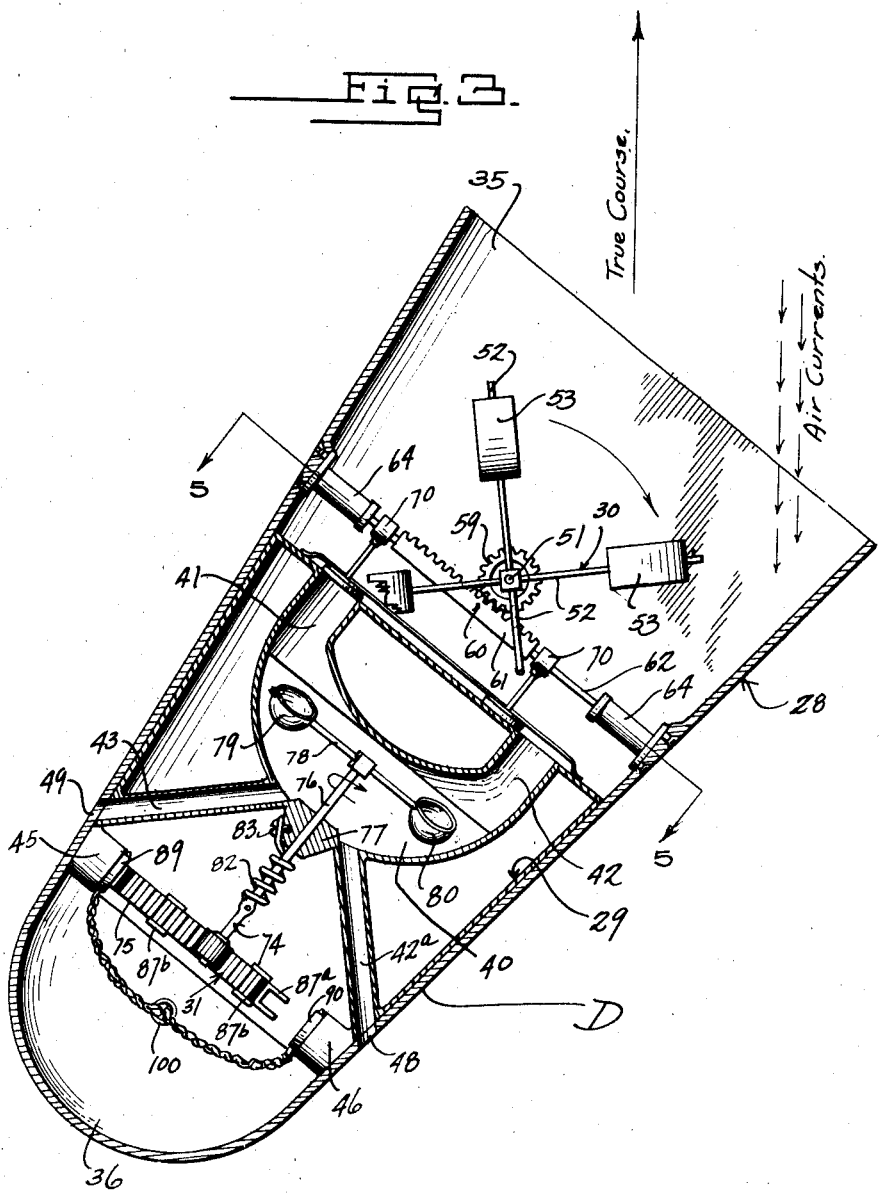

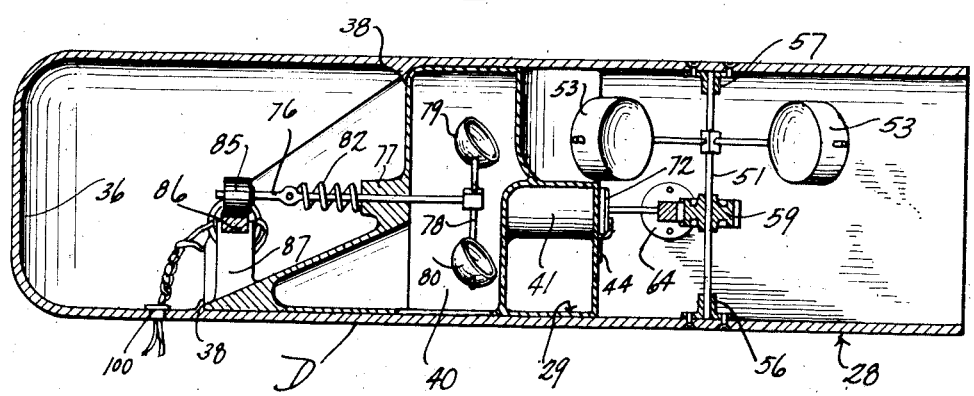
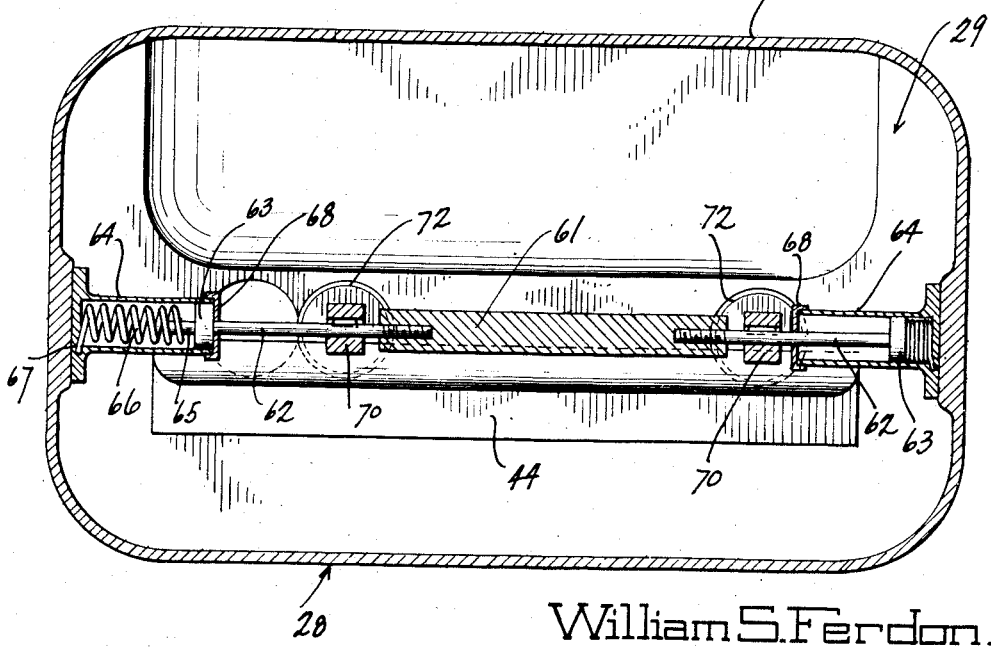

March 4, 1924.
W. S. FERDON
AERODYNAMIC STABILIZER FOR AIRCRAFT
Filed Oct. 22, 1921   7 Sheets-Sheet 5
1,485,781
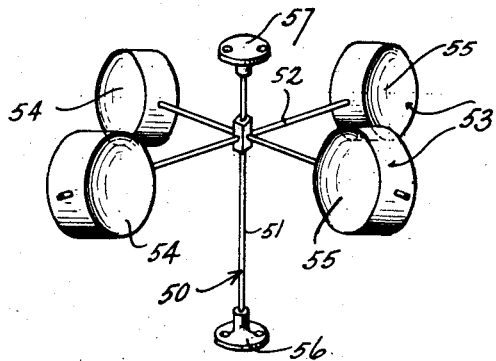
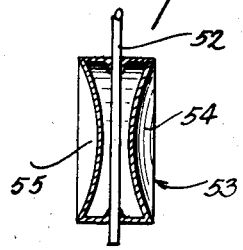
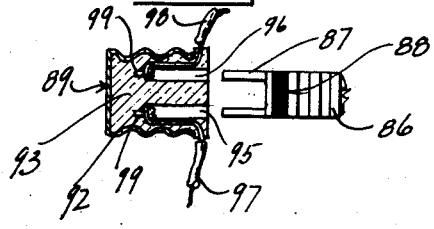
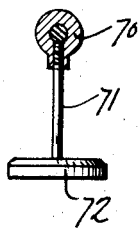
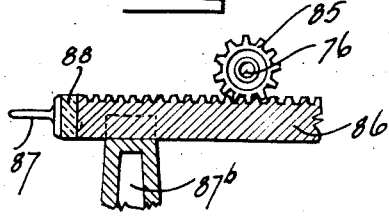
William S. Ferdon,
Inventor
By Lancaster Allwine
Attorney

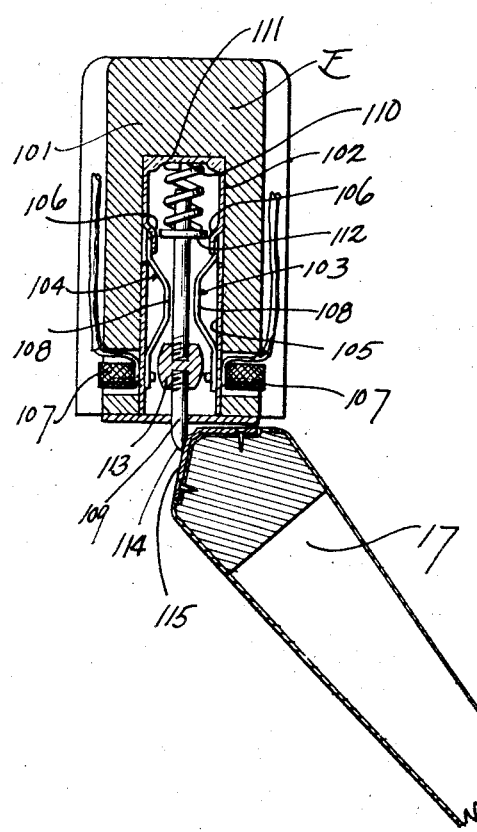
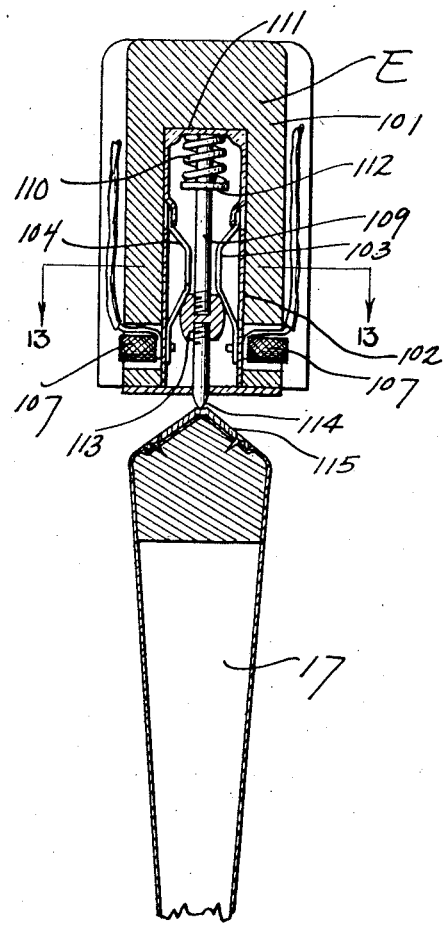
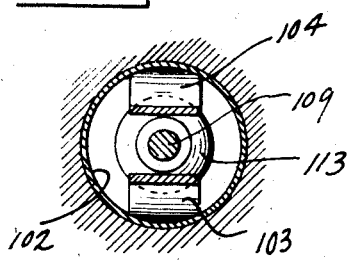

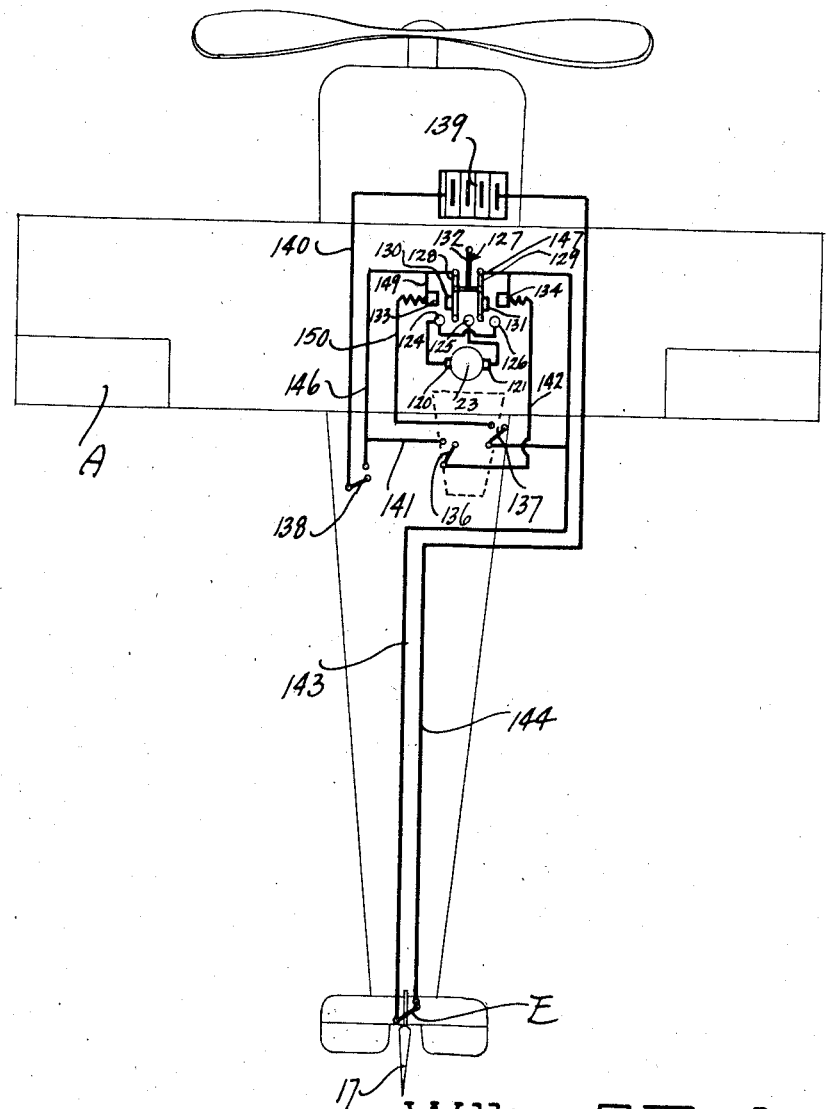

Patented Mar. 4, 1924.

1,485,781

UNITED STATES PATENT OFFICE.

WILLIAM SHAW FERDON, OF BROWNLEE, NEBRASKA.

AERODYNAMIC STABILIZER FOR AIRCRAFT.

Application filed October 22, 1921. Serial No. 509,646.

*To all whom it may concern:*

Be it known that I, WILLIAM S. FERDON, a citizen of the United States, residing at Brownlee, in the county of Cherry and State of Nebraska, have invented certain new and useful Improvements in Aerodynamic Stabilizers for Aircraft, of which the following is a specification.

This invention relates to an apparatus for automatic directional control of aircraft.

The primary object of the invention is the provision of an aerodynamic stabilizer for automatically maintaining an aircraft in a predetermined course.

A further object of the invention is the provision of an air pressure operated device for automatic control of an aircraft steering mechanism.

A further object of the invention is the provision of a motor controlled steering device for aircraft and including an aerodynamic controlling apparatus for automatic regulation of said steering motor.

In the drawings, wherein similar reference characters designate corresponding parts throughout the several views, Figure 1 is a fragmentary perspective view of an aeroplane showing a standard manually operated control apparatus thereon for steering of said aeroplane, and including the improved automatic control associated therewith.

Figure 2 is a horizontal cross sectional view taken through an aerodynamic control mechanism embodied in the steering arrangement, and showing an inactive position of the details of said mechanism.

Figure 3 is a horizontal cross sectional view taken through the aerodynamic control mechanism illustrated in Figure 2, and showing the arrangement of details as they would appear when the aircraft to which said mechanism is attached swerves from its true course.

Figure 4 is a vertical longitudinal cross sectional view taken through the aerodynamic controlled apparatus illustrated in Figure 2.

Figure 5 is a transverse cross sectional view taken on the line 5—5 of Figure 3.

Figure 6 is a perspective view of a propeller arrangement used in the apparatus illustrated in Figure 2.

Figure 7 is a cross sectional view of one of the propeller blades illustrated in Figure 6.

Figure 8 is a view, partly in cross section, illustrating a switch as used in the aerodynamic control device.

Figure 9 is a cross sectional view through several details of the improved device illustrated in Figure 2.

Figure 10 is a view, partly in cross section, illustrating a valve used in the improved air craft controlling device.

Figure 11 is a cross sectional view through a portion of the air craft and steering mechanism, and illustrating a safety switch in an inactive position.

Figure 12 is a cross sectional view of the mechanism illustrated in Figure 11, and showing the safety switch embodied therein when in closed position.

Figure 13 is a transverse cross sectional view taken on the line 13—13 of Figure 12.

Figure 14 is a plan view of an electric wiring diagram superimposed upon an air craft, and showing the electric control mechanism as used in connection with the aero-dynamic control stabilizing apparatus.

In the drawings, wherein for purposes of illustration is shown the preferred embodiment of my invention, the letter A designates an air craft of the aeroplane type and having the standard manual operating means B thereon for actuating the rudder of said aircraft for steering purposes; electric control means C being likewise mounted upon said aircraft A for actuation of the steering rudder, for directional control of said aircraft. An aerodynamic circuit control mechanism D is provided for automatic operation of the electric control means C; the safety switch device E being positioned in the wiring system of the electric control mechanism C and for use in connection with the steering rudder of the aircraft A to prevent damage thereto.

The improved steering system is of course adapted for use upon various types of aircraft. For purposes of illustration, however, the airplane A has been shown, provided with an ordinary empennage, including elevating rudders 15, a vertical fin 16, and the conventional steering rudder 17. The cock pit of the aeroplane fuselage is preferably provided with the ordinary rudder foot bar 20 having the cables or wires 21 leading therefrom to the steering rudder 17 for manually directing the aeroplane A in its course. The foot bar 20, cables 21 and rudder 17 form the means B for manually maintaining the directional stability of the aeroplane A.

The automatic electric control system C for maintaining the directional stability of the aeroplane A independent of the manual means B preferably comprises the motor 23, which may be of the vertical type as illustrated in the drawings, and including a pulley 24 for receiving a flexible cable 25 thereon, the opposite ends of said cable leading to the rudder 17 much in the same manner as the manually operated cables 21.

The automatic control apparatus D is in circuit with the motor 23, and in fact is provided for controlling operation of said motor in a manner to be subsequently set forth.

The automatic control apparatus D is adapted for mounting in any position upon an aircraft, whereby air currents may operate directly thereupon. The preferred mounting of the apparatus D is upon the top of the upper plane 27, and centrally of its ends, substantially as illustrated in Figure 1 of the drawings. This automatic control apparatus D includes the main housing or casing 28, an inner casing 29, a valve operating mechanism 30, and a switch control apparatus 31.

The main housing 28, may be of any approved non-corroding material, such as aluminum, copper, nickel or the like. The same is preferably of stream line formation, tapering from its mouth end or entrance 35 to the rear closed end 36 thereof, where the same is rounded. The main housing 28 is preferably rectangular in cross section. The inner casing 29 is adapted for disposal within the main casing 28 and to receive certain mechanism of the valve operating mechanism and switch control mechanism to be subsequently set forth. This casing 29 is tapered in formation, to conform to the shape of the main casing 28 and is slipped into the main casing 28 through the mouth entrance 35, where the same assumes an exact position due to the tapering formation of the main casing 28, and resting against certain stops 38 provided in projecting manner upon the interior surface of the main casing 28 as illustrated in Figure 4. The inner casing 29 may be of any approved non-corroding material and either bent or molded to the compound formation thereof. The same preferably includes an air pressure chamber 40 having the two inlet ports 41 and 42 in horizontal alignment for entrance of air; the outlet or weeper ports 42ª and 43 being provided for escape of air from the chamber 40, after the same has served its desired function to be subsequently mentioned. A valve guide trough 44 is provided forwardly of the casing 29, extending immediately below the ports 41 and 42, and for the reception of certain valves of the valve operating mechanism 30 to be subsequently described. Suitable sockets 45 and 46 are provided in horizontal axial alignment upon the rear of the casing 29 and for cooperation with certain parts of the switch control mechanism 31 to be hereinafter described. In positioning the inner casing 29 within the main housing 28, the outlet ports 42ª and 43 align directly with openings 48 and 49 respectively, in the sides of the main housing 28. In this position, the inlet ports 41 and 42 face the entrance openings 35, to directly receive air currents entering the housing 28.

Referring now to the valve operating mechanism 30, the same is provided for regulating control of air currents into the ports 41 and 42 in selective manner, depending upon the manner in which said currents enter the mouth 35 of the housing 28. The valve control mechanism 30 principally embodies a propeller arrangement 50 simulating somewhat the anemometer type of propeller, and including a vertical shaft 51, having a plurality of horizontal cross arms 52 radiating therefrom near the upper end thereof. Each of the arms 52 are provided upon their outer ends with a blade 53 of novel formation. These blades 53 are preferably cylindrical and having both faces 54 and 55 thereof concaved, whereby air currents may gain an even footing on said blades to uniformly rotate the propeller. This vertical propeller rod or shaft 51 is rotatably mounted centrally of the sides of the main housing 28 and immediately adjacent the entrance opening 35 thereof, and within suitable sockets 56 and 57 detachably mounted upon the bottom and top of the main housing respectively. The propeller arrangement 50 is adapted to rotate both to the right and to the left, depending upon the direction in which air currents are entering the mouth 35. A gear wheel 59 is keyed or otherwise fastened to the vertical shaft 51, and engages the teeth of a rack structure 60 for reciprocating said rack structure 60 to the right or left, depending upon the rotation of the propeller arrangement 50.

The rack structure 60 preferably includes the rack 61 and having bolts 62 detachably mounted in each end and extending longitudinally thereof. Suitable plunger heads 63 are provided upon the free ends of the rack bolts 62 and for reciprocating within suitable cylinders 64, which are detachably mounted any preferred manner upon the interior of the sides of the main housing 28. A short end 65 of each of the bolts 62 projects beyond its plunger 63, and for receiving a spiral spring 66, which is disposed in each of the cylinders 64 and suitably fastened as at 67 therein. Caps 68, or the like, may be placed over the mount of the cylinder 64, to prevent foreign material and the like from entering the cylinders 64 to interfere with the reciprocatory movement of the plunger 63 therein. These plungers 63 and spiral springs 66 have been provided for co-operation with the cylinders 64 to normally maintain the propeller arrangement in a fixed position when the air currents are not acting eccentrically thereon. It can readily be seen that if the propeller arrangement 50 is rotated in one direction, the rack 61 will be fed, whereby the plunger 63 of one of the rack bolts 62 will depress a spring 66 within its cylinder 64, and thus exerting a counter pressure to the force which is moving the propeller 50. However, when the propelling force is removed, the depressed spring 66 will force the rack 61 to normal position, to rotate the propeller arrangement 50 by means of the gear wheel 59 into its fixed normal position.

Suitable sleeves 70 are positioned upon each of the rack bolts 62 to detachably receive the stems 71 of the valves 72, which are adapted for co-action with the ports 41 and 42 to control entrance of air currents in the pressure chamber 40. The valve stems 71 may be screw threaded upon their ends with the fastening sleeve 70 whereby they are firmly keyed to the shafts or rack bolts 62. The disc valves 72 are adapted for sliding movement within the valve troughs 44 provided on the casing 29 and are reciprocated over the ports 41 and 42, by reciprocatory movement of the rack structure 60.

The switch control means 31 includes a propeller arrangement 74 and a switching device 75. The propeller apparatus 74 includes a shaft 76 adapted for horizontal mounting in the bearing 77 of the inner casing 29, in such manner that an end extends into the pressure or air current chamber 40. This end of the shaft 76 which extends into the chamber 40 is provided with a vertically rotating cross bar 78, having the hemispherical members 79 and 80 upon the ends thereof, and for cooperation with the ports 41 and 42 respectively of the casing 29. It is preferred that the propeller blades 79 and 80 be cupped shaped in formation and tipped as illustrated in the drawings, whereby the air currents entering through the ports 41 or 42 will enter the respective cups 79 and 80, and tend to force the same downwardly. In this manner, the air currents entering the port 41 will enter the cup 79 and tend to turn the same counter-clockwise. On the other hand, the air currents entering the port 42 impinge in the tilted cup blade 80 and tends to rotate the propeller device 74 in clockwise manner. A portion of the shaft 76 extends exteriorly of the chamber 40 to the rear of the housing 28 and is provided with a spiral expanding and contracting spring 82 in engagement with said shaft 76, and detachably engaging the casing 29 as at 83, whereby said spring 82 normally maintains the shaft 74 in one position, and positioning the blades 79 and 80 to directly receive air currents from their air ports 41 and 42 in uniform manner.

A gear wheel or pinion 85 is keyed or mounted upon the end of the shaft 76 remote from the propeller blade, and normally in engagement with the teeth of a rack 86, for reciprocation of said rack upon the shaft 76. The rack 86 is supported in bearings 87$^b$ for proper reciprocation. The ends of the rack 86 are provided with electric circuit closing plugs 87 and 87$^a$, extending longitudinally of said bar 86 and insulated therefrom as at 88, in any approved manner. The plugs 87 and 87$^a$ are adapted for cooperation in suitable electric sockets 89 and 90 for detachable positioning in the socket portions 45 and 46 respectively of the casing 29. The electric sockets 89 and 90 are identical in formation, each including the externally screw threaded metallic casing 92 and the porcelain core 93. This porcelain core 93 is provided with a pair of recesses or depressions 95 and 96 therein, for entrance of the prongs of the plug 87. The terminals of suitable conducting wires 97 and 98, are detachably held in the recesses 95 and 96 as by screws 99, whereby when the plug 87 enters the recesses 95 and 96, a circuit is closed. It can readily be seen from the foregoing that the plugs 87 and 87$^a$ are in reality switch arms which cooperate with the plugs 89 and 90 respectively, for the control of independent circuits in the electric system of the directional stabilizing system, and which will be specifically set forth hereinafter. The various wires from the plugs 89 and 90 may exit through the main housing 28 as at 100.

In operation of the automatic control apparatus D, the entrance or mouth 35 thereof normally faces the direction of movement of the airplane A and whereby the air currents incident to movement of the airplane A through space, enter the mouth 35. Assuming the airplane to be flying in a set course, the rudder 17 will of course, be positioned in longitudinal alignment with the fuselage of the airplane A. Air currents entering the mouth 35 will contact evenly upon the opposite propeller blades 53, which are normally set substantially as illustrated in Figure 2, and thus prevent any rotation of the shaft 51. The valves 72 will remain in position substantially as indicated in Figure 2, whereby substantially one half of each of the ports 41 and 42 are covered, and thus allowing a uniform volume of air to enter each of the ports 41 and 42 being the same, it will contact in the cup shaped propeller blades 79 and 80 and act evenly upon this propeller blade 74 preventing any oscillation or rotation thereof. The air then escapes through the exit ports 42$^a$ and 43'.

Since no rotation of the propeller 74 is effected, the switches 87 and 87ᵃ do not enter their respective pockets for closing an electric circuit.

Assuming the airplane A to swerve from its course, as by any unexpected atmospheric conditions, or by displacement of the rudder 17, the air entering the mouth 35 will act eccentrically upon the propeller arrangement 50. This is of course readily apparent, since immediately upon swerving of the airplane A from its true course, the same will be carried in its swerved position for a short distance along the true course due to momentum of the airplane A, and thus allowing air currents to enter one side of the main housing 28 with greater force and volume than upon the other side. As illustrated in Figure 3, the airplane has swerved to the right and as indicated therein, the air currents will contact the right side of the housing 28 and rotate the propeller arrangement 50 to the left as indicated in this Figure 3. This rotation of the propeller arrangement will reciprocate the rack structure 60 whereby the plunger 63 will depress the spring 66 upon the left side of the device D and moving both of the control valves 72 to the left. Such movement of the valves 72 will have the effect of entirely closing the port 41, and entirely opening the port 42. Air currents will then be solely directed into the pressure chamber 40 through the port 42 and will impinge entirely into the blade 80, rotating the propeller arrangement 74 in clockwise manner, as can be readily seen, and forcing the switch arm or plunger 87 into the electric socket 89 for closing a circuit. The closing of the circuit will act upon the electric control system C for operating the motor 23 thereof in such manner that the cables 25 are wound upon the pulley 24 for swinging the directional rudder 17 to the left. Such swinging of the rudders 17, of course, swings the entire aeroplane A to the true course, when the air enters the mouth 35 in uniform manner, and the springs 64 and 82 of the improved device D breaks the circuit acting through the motor 23 and the rudder 17 assumes its normal set position for steering the aeroplane A in its true course.

The safety switch E is adapted for use in connection with the rudder 17, and resembles to a great extent the safety switch structure shown in my copending application, Serial No. 476,935, filed June 10, 1921. This safety switch structure has been provided to prevent too great swinging of the rudder 17, breaking the circuit in the motor 23 which operates the cable 25, and absolutely determining a maximum position into which the rudder 17 can be swung with safety. The switch E is provided for use in either the vertical fin or tail support of the aeroplane A, in such manner that the same may co-act with the rudder 17. A portion of the support 101 is hollowed out to provide a pocket for reception of the insulated casing 102. The casing 102 can be of any approved material and is preferably circular in formation. Leaf spring terminals 103 and 104 are preferably resiliently and detachably disposed in the interior of the casing 102, said terminals being held in detachable manner therein by instruck portions 106 of the casing 102, and held at their opposite ends by the adjustable and detachable terminal screws 107. An intermediate portion 108 of each of the springs 103 and 104 is bowed inwardly toward the center of the casing 102. The terminals of the springs 103 and 104 are in circuit with conducting cables or wires as shown in Figures 11 and 12, and which are in circuit in the electric control system C, said cables or wires being attached to the casing 102 by the terminal screws 107. A plunger rod 109 is provided for reciprocation, and is centrally disposed in the casing 102 being resiliently forced outwardly toward the rear end of the rudder 17, by a spring 110 under compression intermediate the bottom 111 of casing 102 and a disc portion 112 on a plunger rod 109. The plunger rod 109 is preferably in two pieces to detachably connect a contact head 113, adapted for bridging the gap between the spring terminals 103 and 104. A pointed or bevelled head 114 is preferably shaped upon the extreme outer end of the plunger 109 and adapted for riding upon and contacting with the substantially V-shaped plate 115, positioned upon the rear surface of the rudder 17.

As illustrated in Figure 12, the contact head 113 is in engagement with the terminal springs 103 and 104, and of course, the circuit closed between the conducting wires. However, as the control surface or rudder 17 swings upon its pivot, the plunger rod 109 reciprocates in the casing 102 under expansion of the spring 110. As the rudder 17 reaches its maximum steering angle, the bevelled head 114 of the plunger 109 rides over the wear plate 115, and the spring 110 forces the contact head 113 in such position as to be out of engagement with the terminal springs 103 and 104. In this position, the circuit between the conducting wires is, of course, broken and prevents the automatic swinging of the rudder 17 beyond its maximum safety angle, and which will be subsequently described in setting forth the wiring system.

Referring now to the diagrammatic illustration of the wiring system as shown in Figure 14. The motor 23 is of the reversible type, in order to positively operate the directional rudder 17 both to the right and to the left for steering purposes. The means employed in this motor 23 for reversing a current therein is altogether similar to the means employed in the reversible motors illustrated and described in my copending application, Serial No. 476635, filed June 10, 1921. In connection with the terminals 120 and 121 of the motor 23, three contact points 124, 125 and 126 are provided and connected in a manner to be subsequently set forth in describing the cycle of operation. A pole changing switch 127 is provided in connection with motor 23, to properly reverse the current therein. This pole changing switch includes a pair of switch blades 128 and 129 each pivotally connected at one end remote from the contact points of the motor 123, and provided with the armatures 130 and 131 respectively and insulated, as to their mounting upon said blades. A spring 132, preferably a leaf spring, is provided for engaging a connecting piece between said switch blades for bringing said blades 128 and 129 into a neutral position with respect to the contact points of the motor 123. It is preferred that the armatures 130 and 131 be provided for cooperation respectively with electromagnet structures 133 and 134. In the automatic control apparatus D, the electric socket 89 and its cooperating closure plunger 87 form a switch structure which is designated in the wiring diagram, illustrated in Figure 14, by the numeral 136. Similarly, the electric socket 90 and the cooperating closure plug 87ª is designated in the wiring diagram as the switch structure 137. It is preferred that a switch structure 138 be provided in the electric control system C whereby the entire system may be collectively used or cut off at the pilot's discretion, said switch 138 being preferably disposed in the cockpit of the fuselage.

Assuming, as above described, the airplane A to swerve to the right, the switch mechanism 136 would be automatically closed through cooperation of the mechanisms in the automatic control apparatus D. A storage battery 139 is of course provided in the system C and having a lead wire 140 leading directly to the pilot's switch 138. This switch 138 being closed, the current is then directed by a conducting wire 141 into and past the closed switch structure 136, and the current conducted by a wire or conductor 142 directly into the electromagnet 134, above mentioned as cooperating with the armature 131 of the pole changing device 127. The current is then directly conveyed through the connecting wire 143, through the safety switch structure E which is disposed in the vertical fin or tail support and adjacent the rudder 17. Since this switch E is normally closed due to action of the rudder 17, the current is conveyed by a connecting wire 144 directly back into the storage 139. This circuit of the current will of course, magnetize the electromagnet 134 and attract the armature 131, which will throw the switch blades 128 and 129 to contact the points 125 and 126 of the motor 23. A conducting wire 146 is shunted from one terminal of the pilot switch 138 and connects the pivoted end of the switch blade 128, thus permitting current to enter said switch blade and pass the contact point 125 entering through the right hand terminal 121 of the motor 23. The current exits through the terminal 120 and is directed past the contact point 124 into the contact point 126, where said currents flow through the switch blade 129. A conducting wire 147 in circuit with the pivoted end of the switch blade 129 conveys the current directly into the conducting wire 143 above described, where the current is directed past the safety switch E, through the conducting wire 144 and returning to the storage battery 139. This circuit of the current actuates the motor 23 whereby the rudder 17 is swung to the left for properly steering the aeroplane A back to its true course.

Now assuming, the aircraft A to swing to the left, the switch structure 137 will then be automatically closed through operation of the mechanism in the automatic control apparatus D. The current will then flow from the battery 139 to wire 140, past switch 138, through the wire 146 and by means of the branch wire 149 will enter the electromagnet 133. A conducting wire 150 then leads the current past the closed switch 137 and into the conducting wire 143, past the closed switch E, and by means of the return wire 144 back into the storage battery 139. This, as can be seen, magnetizes the electromagnet 133 and attracts its armature 130 for throwing the switch arms 128 and 129, of the pole switch structure 127, to engage the contact points 124 and 125 of the motor 23. The current will then flow, as above described, through the switch arms 128 and 129 of the pole changing switch 127 in such manner that the current flowing first through the switch arm 128 will then flow to the terminal 120 of the motor 123 and entering the motor 23 in a reverse direction to that above described. This, of course will have the effect of reversing the motor when a complete circuit is made. The current exits through the terminal 121 of the motor 23, past the contact point 125, through the closed switch blade 129 and flowing through the wires 143 and 144 past the closed switch E returning to the battery 139. The actuation of the motor 23 to rotate the pulley 24 in reverse manner to that above described when the pulley in the rudder was swung to the left, will of course, swing the rudder to the right, and bring the swerving plane back into its true course.

From the above description, taken in connection with the drawings, it can be seen that a directional stabilizing system for aircraft has been provided which is automatically operable by air current and eccentric wind pressure to perform the above outlined operations. By this apparatus, an aircraft may maintain a true course, relieving the pilot of a great amount of manual operation and observation. The apparatus in the automatic control device D will likewise compensate for propeller torque, since this propeller torque is very likely to swerve the airplane or aircraft A out of its true course. It is a well known fact, that an aircraft being propelled through space encounters a constant stream of air, which seemingly flows in one particular circuit. However, any variation in the line of flight will propel the aircraft for a short period in the line of flight, even when the nose of said aircraft is pointed in a different direction. This fact has been taken advantage of in utilizing the air current from the true course to operate the control mechanism.

Various changes in the shape, size and arrangement of parts, may be made to the form of the invention herein shown and described, without departing from the spirit of the invention or the scope of the claims.

I claim:

1. A directional stabilizing system for aircraft comprising an electric control system for operation of the rudder of an aircraft, aerodynamic actuated means for automatic operation of said electric control system, and limiting safety switch means in said electric control system for operation by said rudder at a predetermined positioning of said rudder.

2. A directional stabilizer for aircraft comprising a steering member, reversible motor means for actuating said steering member, automatic actuating means in circuit with said reversible motor means, and a safety switch for operation by said steering member and normally closed in circuit with said motor means, said switch automatically breaking said circuit upon assuming certain steering positions.

3. An aerodynamic operated apparatus for closing a circuit, comprising valves for air control, and air controlled mechanism operated by said air for selective circuit closing.

4. In a device of the class described, the combination of a casing, a circuit and air controlled switch means in said casing for selective circuit closing.

5. An aerodynamic control apparatus, comprising a support, valve means on said support for air pressure control, and air pressure mechanism controlled by said air pressure for selective switch operation.

6. In a device of the class described, an aerodynamic control apparatus, comprising valves, air current controlled propellers for operation of said valves, switches, and means controlled by said valves for automatic operation of said switches.

7. A device of the class described, comprising a casing having ports therein, air current operated valve means for control of air currents through said ports, switches in said casing, and mechanism for operation by the air currents from said ports for automatic control of said switches.

8. In a device of the class described, the combination of a casing having ports therein, valves, an air pressure operated propeller, means connecting said propeller and valves for control of air pressure into said casing ports, switches, and means including a propeller for actuation by the air pressure from said casing ports for automatic operation of said switches.

9. In a device of the class described, the combination of a casing, propeller rotatably disposed in said casing, a rack for operation by movement of said propeller, valves controlled by movement of said rack, a second propeller operated by movement of said valves, a second rack for operation by movement of said second propeller, and switches operated by movement of said second rack.

10. An aerodynamic controlled apparatus comprising a stream line casing having entrance ports and outlet ports, propeller operated valve control means for regulation of air current through said inlet ports, and propeller operated switch control means for operation by air currents from said inlet ports.

11. An aerodynamic controlled circuit closing device comprising a casing provided with an entrance opening and having inlet and outlet ports therein, a propeller rotatably mounted adjacent said casing opening, rack means for operation by said propeller, means for normally operating said rack to hold said propeller in a set position, valves mounted upon said rack means and adapted for disposal over the inlet ports of said casing for uniform control of air through said inlet ports, a second propeller rotatably mounted in said casing and adapted for operation by flow of air through said inlet ports, a second rack for operating the second propeller, and switch mechanisms in said casing for operation by said second rack.

WILLIAM SHAW FERDON.